United States Patent
Rosenbluth

[11] Patent Number: 6,052,231
[45] Date of Patent: Apr. 18, 2000

[54] BEAM DIVIDING ELEMENTS PERMITTING PROJECTION OF AN IMAGE WITH HIGH CONTRAST

[75] Inventor: Alan Edward Rosenbluth, Yorktown Heights, N.Y.

[73] Assignee: International Business Machines Corporation, Armonk, N.Y.

[21] Appl. No.: 09/233,711

[22] Filed: Jan. 19, 1999

Related U.S. Application Data

[60] Provisional application No. 60/072,081, Jan. 21, 1998.
[51] Int. Cl.[7] .............................. G02B 5/28; G02B 27/14; G03B 21/00; G02F 1/1335
[52] U.S. Cl. ...................... 359/636; 359/629; 359/634; 359/640; 349/57; 349/114; 353/30; 353/31
[58] Field of Search .................................. 359/483, 485, 359/490, 502, 618, 629, 634, 636, 638, 640, 833, 834; 349/57, 104, 113, 114; 353/30, 31, 34, 81

[56] References Cited

U.S. PATENT DOCUMENTS 5,459,593 10/1995 Ootaki .......................................... 359/40
5,594,591 1/1997 Yamamoto et al. ........................... 349/5
5,914,817 6/1999 Browning et al. ....................... 359/634
5,986,815 11/1999 Bryars ........................................ 359/634

FOREIGN PATENT DOCUMENTS

0 389 240 A2 3/1990 European Pat. Off. ......... G02B 27/10

*Primary Examiner*—Georgia Epps
*Assistant Examiner*—David N. Spector
*Attorney, Agent, or Firm*—Scully, Scott, Murphy & Presser; Daniel P. Morris, Esq.

[57] ABSTRACT

An optical element useful in optical systems such as liquid crystal optical display devices which is capable of projecting images having a high degree of contrast is provided. The optical element comprises a set of prisms whose coatings are designed to cancel one component of the depolarization in the light the prisms deliver. The other depolarization component is removed by returning the light to the projection lens through the same sequence of color-dividing coatings in reverse order. Hence, the optical element eliminates the depolarization components by employing double-pass propagation of polarized light therethrough.

14 Claims, 4 Drawing Sheets

BEAM DIVIDING ELEMENTS PERMITTING PROJECTION OF AN IMAGE WITH HIGH CONTRAST

RELATED APPLICATIONS

This application claims benefit of U.S. Provisional Application Ser. No. 60/072,081 filed Jan. 21, 1998.

FIELD OF THE INVENTION

The present invention relates to a beam dividing element useful in polarization-based light valve projectors, and more particularly to a set of prisms which are designed so as to remove one component of the light the prisms deliver to the light valve; the remaining depolarization component is removed by returning the light to the projection lens through the same sequence of color-dividing coatings (in reverse order) found on the prisms.

BACKGROUND OF THE INVENTION

In the field of polarization-based light valve projectors, reflective light valves are presently employed in projection devices since they allow a single set of beam-dividing elements to be used twice; first for color separation, and then for recombination. The use of one or more dichroic coatings in prior art double-pass optical arrangements gives rise to contrast problems however because the three-dimensional beam geometry causes polarization mixing. Both polarizations must be allowed to reflect or transmit from such double-pass coatings; this rules out pre- or post-filtering to correct the polarization mixing.

Even if double-pass color prisms are not employed, reflective light valves require that at least one coating be used twice, namely the polarizing beam splitter (PBS). Some loss in contrast arises even from this one coating, particularly as the numerical aperture (NA) increases. The term "numerical aperture" is used herein to denote the sine of the illuminating solid cone angle or the square root of the solid angle/π.

Even though this contrast problem exists and has been known for several years, there are no known solutions in the prior art for solving this problem which can be used in all optical systems and/or configurations. One known solution to this problem which is specific for a single light valve polarization beam splitter system is described in European Patent EP 0 389 240 A2 to Matsushita, Electric Industrial Co., Ltd. ("EPA '240"). Specifically, EPA '240 discloses a quaterwave plate that completely corrects a compound angle depolarization from a polarizing beam splitter, if a light valve behaves like a mirror when switched to the black-state.

Although the prism system disclosed in EPA '240 is reportedly useful in improving contrast in a single light valve polarization beam splitter system, it can not be employed in all optical configurations, or with most polarization-modulating light valves. Instead, it is specific for use in a single light valve polarization beam splitting system such as described in the disclosure of EPA '240. Although the prism system disclosed in EPA '240 has limited use, it is presently being used in many projection display devices.

In view of the above-mentioned drawbacks in the prior art, there is a continued need to develop new and improved optical elements, i.e. beam dividing elements, which can be employed to improve contrast imaging in any optical configuration, or with any polarization-modulating light valve. Such an optical element is particularly needed with liquid crystal light valves.

SUMMARY OF THE INVENTION

One object of the present invention is to provide an optical element, i.e. beam dividing element, which is capable of projecting a high resolution image.

Another object of the present invention is to provide an optical element, i.e. beam dividing element, which can be employed in any optical system and with any polarization-modulating light valve.

A further object of the present invention is to provide an optical system which contains an optical element, i.e. beam dividing element, which is capable of eliminating unwanted depolarization components by a double-pass mechanism through an optical element.

These and other objects and advantages are achieved in the present invention by employing a set of prisms whose dichroic coatings have been designed so as to cancel one component of depolarization that the prisms deliver to the light valve. The remaining depolarization component is canceled by returning the light to the projection lens through the same sequence of color-dividing coatings (in reverse order) that are traversed between illuminator and light valve.

Broadly speaking, the present invention eliminates unwanted depolarization of an incident beam transmitted thereto in two stages. In one stage, one component of depolarization is eliminated by a predetermined symmetry of the beam dividing element whereby light reflected therein is transmitted to a projection lens by returning the reflected beam through the same sequence of color-dividing coatings in sequentially the reverse order as the incident beam enters the beam dividing element. In the other stage, the optics are so designed so that the phase of depolarization caused by the optics is made equal to the negative phase of depolarization caused by adjacent light valves. By designing the optical element with the above taken into consideration, the unwanted depolarization rays are canceled and thus a higher contrast image can be projected.

When the projection system contains light valves which are mirror-like, the beam dividing element of the present invention comprises at least one surface which is adapted for receiving an incident beam having linear polarization. The at least one surface of the beam dividing element of the present invention has at least one dichroic coating thereon which is characterized as being able to transform skew rays of an input linear polarized beam passing therethrough to elliptically polarized rays having a principal axis at a first predetermined orientation with respect to the direction of the input polarization of the linear polarized beam.

The at least one surface is also adapted for receiving a return elliptically polarized beam. Specifically, the least one coating that is employed in the beam dividing element of the present invention transforms at least 99% or more of the return elliptically polarized beam into a linear polarized beam which is coincident with the input linear polarized beam and which is in the same direction of polarization as the input linear beam when the elliptically polarized beam and the input linear polarized beam have opposite directions of rotation when viewed from the direction of propagation. Moreover, when the return elliptically polarized beam has a second predetermined orientation of its principal axis with respect to the direction of the polarization of the linear beam, the at least one coating of the beam dividing element of the present invention reflects at least 99% of the return polarized beam into a linear beam having a linear polarization substantially perpendicular to the linear beam when the return elliptically polarized beam has a principal axis having a third predetermined orientation with respect to the direction of the polarization of the incident linear polarized beam which is substantially perpendicular to the second predetermined orientation and has the same direction of rotation as viewed from the direction of propagation.

DETAILED DESCRIPTION OF THE INVENTION

The present invention which provides a novel beam dividing element for use in liquid crystal optical projection systems will now be described in greater detail by referring to the drawings that accompany this application. It should be noted that in the drawings like and/or corresponding elements or components are referred to by like reference numerals. It is further noted that although illustration is made to projection systems having mirror-like light valves, the present invention can also be employed when non-mirror-like light valves are employed.

Before describing the invention in detail, a brief description of the contrast loss mechanism typically associated with prior art optical elements is given herein. Specifically, light rays are incident at the dichroic coatings in a variety of planes. This is because brightness requirements dictate that the beam of light subtend an appreciable angular range, i.e. the incident angle cannot be overly restricted.

A beam with nominally uniform polarization will actually have both S (polarization component that is perpendicular to the plane of incidence formed by the incident and reflected rays) and P (polarization component that is polarized within the plane) polarization components at the different dichroic coatings, due to the compound angle geometries involved. S, P decomposition depends on the ray, surface tilt, and incident polarization (and thus on the previous surfaces encountered).

The tilted surfaces are inherently polarizing causing changes in S to the P ratio (usually via a phase shift) and distorting the output polarization. Both the reflected and transmitted polarizations are changed.

If dichroic coatings must be utilized in a double-pass configuration, the mispolarization cannot be filtered out. Instead, both polarizations must be allowed to reflect and/or transmit through the coatings. The illuminating polarization must be in the dark-state; light reflected by adjacent light valves in this same state will automatically follow the reverse path back to the illuminator. Thus, the light converted to the bright state must be shunted to the projection screen.

Direct suppression of polarization mixing by dichroic coatings is difficult since the polarization-dependence (in phase as well as amplitude) is more or less intrinsic to tilted coatings, particularly those that perform a beam dividing function.

It has been unexpectedly determined that the contrast loss mechanism can be avoided by utilizing a beam dividing element which contains a specific symmetry and which takes into account the phases of depolarization caused by the optics and the light valves. In view of the above, reference is directed to FIG. 1 which shows a basic configuration of the optical projection system of the present invention. Specifically, optical projection system 10 comprises a lamp source 15 such as an arc lamp which is capable of emitting light of various wavelengths. The optical system also includes illumination optics 20 which receive light from the lamp source and produce a uniform density distribution.

Figure 1:
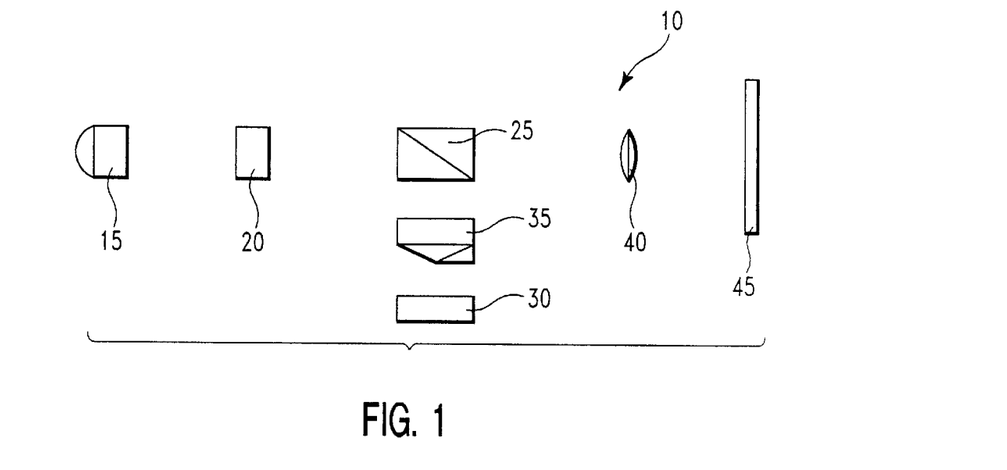
FIG. 1 is a schematic showing the optical projection system of the present invention.

The optical projection system of the present invention further comprises at least one polarizing beam splitter 25 which is coated with a specific dichroic coating and at least one reflective light valve 30, e.g. a liquid crystal light valve.

An optical element (or beam dividing element) 35 is placed behind polarizing beam splitter 25, i.e. in front of light valve 30. The specifics of optical element 35 will be described in greater detail hereinbelow. The optical projection system further includes a projection lens 40 for imaging the common beam and a projection screen 45 for receiving the projected image.

Turning to optical element 35, the optical element of the present invention comprises a set of prisms whose orientation relative to the reflective light valve allows reflected light to be transmitted to the projection lens through the same dichroic coatings in sequentially the reverse order as the entering incident light. Moreover, the optical element of the present invention comprises a set of prisms designed so that the phase of depolarization caused by the optics of the prisms equals the negative phase of depolarization caused by the light valves.

When the light is mirror-like when switched black, the elliptical depolarization from the optics will cancel out in double-pass, but rotational depolarization will double. Suppression of a single-pass rotation can be thought of as a constraint on the system coatings in a single collective degree of freedom. Complete suppression of the coating depolarization, which is very difficult to do, requires that each coating be constrained in two degrees of freedom. For a single-color PBS with no other coatings, rotation can be suppressed with a quaterwave plate.

When light valves are not mirror-like the correction condition takes a more complex form. However, the symmetry still produces a cancellation of depolarization in one degree of freedom. In general, let g be a complex number representing the reflection by the dark-state light valve of the nominal illumination polarization into an output beam of the same polarization. Likewise, P is a complex number representing the single-pass depolarization introduced by the optics on skew rays. The real part of P is the number of degrees of polarization rotation per degree of tilt along the skew meridian. The imaginary part is the number of degrees of ellipticity.

The requirement for cancellation of round-trip depolarization is that the imaginary part of Pxg be zero; the real part automatically cancels out. When the light valve is mirror-like, the condition Im[Pxg]=0 simplifies to a requirement that Re[P]=0, i.e. the single-pass optics depolarization P must be pure imaginary (elliptical but unrotated) to correct double-pass depolarization.

The high contrast condition Im[Pxg]=0 implies that the rotation and ellipticity produced in the illumination by the optics must stand in a certain ratio; the required ratio depends on the light valve properties.

Another way to understand the general case is in terms of an interaction between depolarization from the light valve and depolarization from the optics. For a skew ray propagating at angle θ within the NA, the depolarization Pθ is a complex number describing the elliptical polarization of the ray that is output from the optics when the input is linear polarized with unit amplitude.

In a similar way, a complex depolarization D can be defined for the light valve alone, representing the polarization ellipse produced when a linear polarized beam of unit amplitude is reflected from the dark-state of the light valve. When D is small, the residual brightness of the light valve (LV) when switched black, (B), is $B_{LV}=|D|^2$.

The black-state of the system is:

$$B_{System} = B_{LV}\left\{1 + \left(\text{Re}\left[\frac{P}{D^*}\right]\right)^2 NA^2\right\}$$

wherein $D^*$ is the complex conjugate of D, $B_{LV}$ is the black-state of the light valve, Re is the real part of $P/D^*$, P is a complex number representing the single-pass depolarization introduced by the optics on the skew rays and NA is the numerical aperture.

The imaginary part of the quantity in the square brackets cancels automatically by the double-pass; the real part must be canceled through proper design of the optics.

When contrast is high, the above equation can be written as follows:

$$B_{system} = B_{LV} + 4B_{optics}\sin^2(\psi_{optics}+\psi_{LV})$$

wherein $\psi_{optics}$ and $\psi_{LV}$ are the phases of P and D respectively. In the present invention, the beam dividing element is designed so that $\psi_{optics}=-\psi_{LV}$. Depolarization from the optics amounting to $4B_{optics}\cos^2(\psi_{optic}+\psi_{LV})$ is canceled by the double pass.

In projection system containing mirror-like light valves, a first portion of the undesired perpendicular E-field component that is generated during passage through the optics is eliminated by forcing the polarization ellipse that illuminates the light valve to be parallel to the linear input polarization. This is achieved in the present invention by selecting the phase shifts from the optical coatings according to the following formulae, which specify that the phase of the undesired E-field component be shifted 90° relative to the component that remains in the input direction:

$$0 = \text{Re}\left[\frac{\delta E_{J+1}}{E_{J+1}}\right]$$
$$\cong \text{Re}[(\mathcal{R}+i\mathcal{F})\theta_0] = \mathcal{R}\theta_0$$
$$= \text{Re}\left\{-\left(\prod_{j=1}^{j}\xi_j\eta_j\right)\kappa_0\frac{\theta_0}{n_{PBS}} - \sum_{j=1}^{j}\left[\xi_j\kappa_j(\eta_j-1)\left(\prod_{k=j+1}^{j}\xi_k\eta_k\right)\frac{\theta_0}{n_j\tan\varphi_{0,j}}\right]\right\}\theta_0$$

In this equation, $\mathfrak{R}$ implies that one component of the undesired E-field is canceled out. Re denotes the real part of a complex quantity. $(\delta E/E)_k$ is the complex amplitude of the undesired component in the light that illuminates the kth surface; the final surface J+1 is the light valve. $\Phi_k$ is the angle of incidence at the kth surface. $\xi_k$ is +1, if the surface is transited in transmission, −1 if the surface is transited in reflection. θ is the skew angle of the ray which is not included in $\mathfrak{R}$. $K_k$ is +1, if the kth surface deviates the reflected ray counterclockwise relative to the transmitted ray, and −1 otherwise. $\eta_k\equiv e^{i\Delta_k}$, wherein $\Delta_k$ is the differential phase shift introduced at the kth surface. Near the band edges, the surfaces may exhibit differential efficiency between two polarizations, and $\Delta_k$ will become a complex quantity.

In the present invention, $\mathfrak{R}$ is set to 0, by carefully selecting the phase shift $\Delta_k$ of the color splitting coatings so as to satisfy the above equations.

Figure 2:
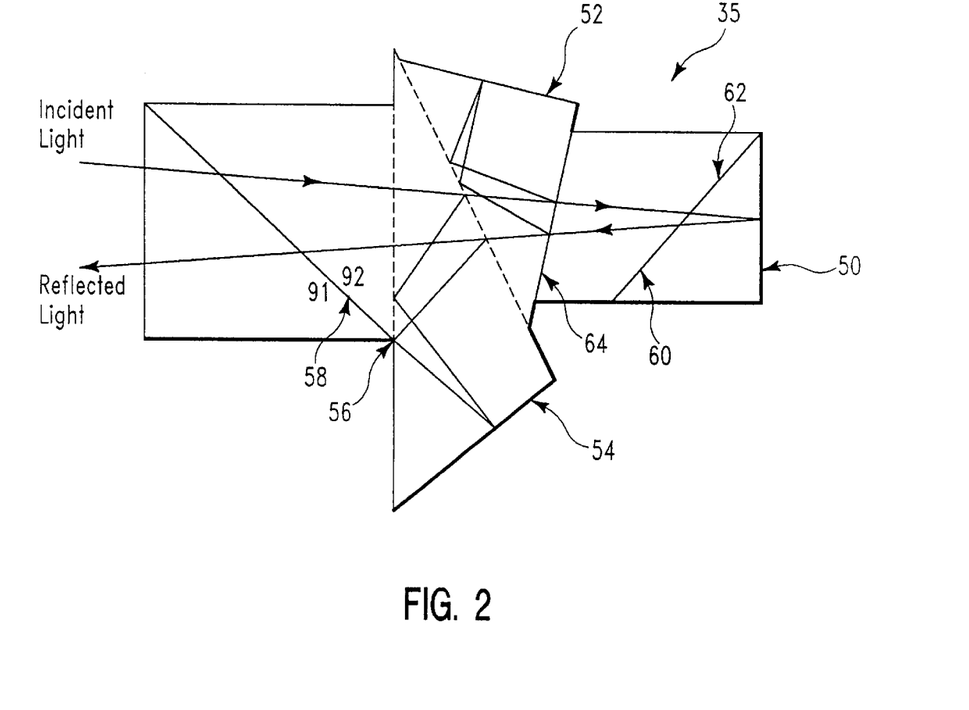
FIG. 2 is an illustration of one possible configuration of the beam dividing element of the present invention.

Additional surfaces can also be introduced to make it easier to satisfy the above equation. Two kinds of additional surfaces can be introduced into the beam dividing element of the present invention. The first is tilted coatings that may be color-neutral or near-neutral in one or more channels of the beam dividing element. The second kind of additional surface is a retarding waveplate that is intrinsically birefringent. These are illustrated in FIG. 2. Specifically, FIG. 2 is one possible arrangement for the beam-dividing element of the present invention. Beam-dividing element 35 comprises waveplates 50, 52, 54 and 56 which are positioned in front of the light valves or polarizing beam splitter. Waveplate retardance is chosen so as to shift the phases provided by the dichroic coatings. Additional "dummy" plates 62 and 64 are also shown. These additional dummy plates contain dichroic coatings that do not affect the intensity of light in the wavelengths that reach them. The dummy coatings do however shift the phase.

Figure 3:
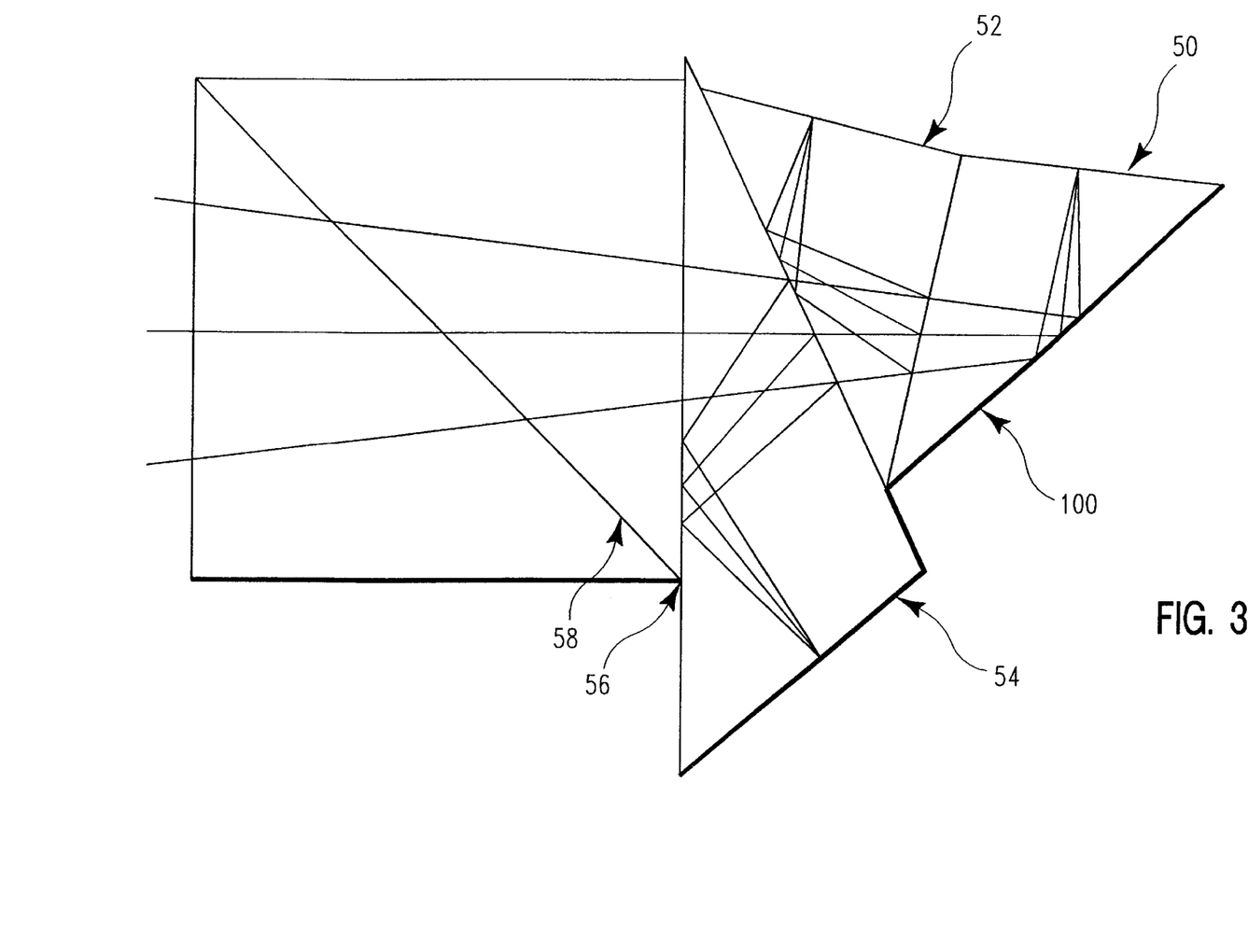
FIG. 3 is another illustration of a possible configuration of the beam dividing element of the present invention.

Another arrangement, as is illustrated in FIG. 3, provides an auxiliary coating 100 on a near −45° prism for achievement of the above 90° phase condition.

The beam splitting coatings on interface 58 can be split across macroscopic layers that are sufficiently thin so as not to introduce perceptible multiple reflections in the layer forming two sets of layers a1 and a2. Specifically, the prisms can be split between coatings of various thicknesses which are typically in the range from about 0.005 to about 0.2 mils on each side of the cement layer between the prisms. FIG. 2 and Table I below illustrate how the polarizing beam splitter (PBS) function can be split between coatings on each side of a cement layer between the PBS cube substrates (This layer of thickness of approximately 1 mil, is not thin enough to be considered an interference film). In FIG. 2 and Table I, coating a1 serves as the PBS coating for red wavelengths, and a2, on the other side of the cement layer, is specific for blue and green wavelengths. The reduced film thickness in each semi-polarized prism coating improves manufacturability, compared with the alternative of putting more layers in a single broadband polarizing beam splitter coating.

Table I further shows two of the coatings that substantially achieve the condition $\mathfrak{R}=1$ for all wavelengths between 430 and 670 nm. The refractive index data for the films was obtained by fitting dispersion curves to the data plotted in B. J. Pond, et al. "Comparison of the Optical Properties of Oxide Films Deposited by Reactive-DC-Magnetron Sputtering with this of Ion-Beam-Sputtered and Electron-Beam Evaporated Films", SPIE v. 2114, p. 345.

TABLE I

| Red semi-PBS (at a1) | | | Blue/Green semi-PBS (at a2) | | |
|---|---|---|---|---|---|
| Layer # | Cement* | Thick (nm) | Layer # | Cement* | Thick (nm) |
| 1 | SiO$_2$ | 124.41 | 1 | SiO$_2$ | 175.53 |
| 2 | Ta$_2$O$_5$ | 130.89 | 2 | Ta$_2$O$_5$ | 42.73 |
| 3 | SiO$_2$ | 93.49 | 3 | SiO$_2$ | 91.59 |
| 4 | Ta$_2$O$_5$ | 46.94 | 4 | Ta$_2$O$_5$ | 53.49 |
| 5 | SiO$_2$ | 94.96 | 5 | SiO$_2$ | 93.19 |

TABLE I-continued

| | Red semi-PBS (at a1) | | | Blue/Green semi-PBS (at a2) | |
|---|---|---|---|---|---|
| Layer # | Cement* | Thick (nm) | Layer # | Cement* | Thick (nm) |
| 6 | $Ta_2O_5$ | 150.46 | 6 | $Ta_2O_5$ | 49.67 |
| 7 | $SiO_2$ | 103 | 7 | $SiO_2$ | 93.74 |
| 8 | $Ta_2O_5$ | 48.2 | 8 | $Ta_2O_5$ | 55.21 |
| 9 | $SiO_2$ | 117.12 | 9 | $SiO_2$ | 100.93 |
| 10 | $Ta_2O_5$ | 121.18 | 10 | $Ta_2O_5$ | 56.23 |
| 11 | $SiO_2$ | 147.1 | 11 | $SiO_2$ | 105.43 |
| 12 | $Ta_2O_5$ | 90.73 | 12 | $Ta_2O_5$ | 61.52 |
| 13 | $SiO_2$ | 77.64 | 13 | $SiO_2$ | 117.88 |
| 14 | $Ta_2O_5$ | 147.65 | 14 | $Ta_2O_5$ | 53.73 |
| 15 | $SiO_2$ | 69.42 | 15 | $SiO_2$ | 88.73 |
| 16 | $Ta_2O_5$ | 57.9 | 16 | $Ta_2O_5$ | 94.6 |
| 17 | $SiO_2$ | 170.63 | 17 | $SiO_2$ | 149.76 |
| 18 | $Ta_2O_5$ | 102.71 | 18 | $Ta_2O_5$ | 71.49 |
| 19 | $SiO_2$ | 152.08 | 19 | $SiO_2$ | 58.55 |
| 20 | $Ta_2O_5$ | 92.51 | 20 | $Ta_2O_5$ | 75.11 |
| 21 | $SiO_2$ | 166.74 | 21 | $SiO_2$ | 135.31 |
| 22 | $Ta_2O_5$ | 97.44 | 22 | $Ta_2O_5$ | 94.77 |
| 23 | $SiO_2$ | 161.45 | 23 | $SiO_2$ | 45.75 |
| 24 | $Ta_2O_5$ | 111.02 | 24 | $Ta_2O_5$ | 13.53 |
| 25 | $SiO_2$ | 177.85 | 25 | $SiO_2$ | 14.5 |
| 26 | $Ta_2O_5$ | 116.41 | 26 | $Ta_2O_5$ | 112.8 |
| 27 | $SiO_2$ | 171.03 | 27 | $SiO_2$ | 154.96 |
| 28 | $Ta_2O_5$ | 105.42 | 28 | $Ta_2O_5$ | 52.6 |
| 29 | $SiO_2$ | 176.65 | 29 | $SiO_2$ | 58.86 |
| 30 | $Ta_2O_5$ | 111.06 | 30 | $Ta_2O_5$ | 167.63 |
| 31 | $SiO_2$ | 202.61 | 31 | $SiO_2$ | 22.06 |
| 32 | $Ta_2O_5$ | 117.18 | 32 | $Ta_2O_5$ | 85.11 |
| 33 | $SiO_2$ | 254.45 | 33 | $SiO_2$ | 111.64 |
| 34 | $Ta_2O_5$ | 23.73 | | F2 Glass | |
| 35 | $SiO_2$ | 108.9 | | | |
| | F2 Glass | | | | |

*$SiO_2$ = Silicon Dioxide
$Ta_2O_5$ = Tantalum Pentoxide

The condition that the real part $\Re$ of the depolarization be zero is equivalent to setting the phase of the depolarization to 90°. The polarization illuminating the light valve is no longer linear, but because $\Re=0$ the major axis of the polarization ellipse is parallel to the linear polarization that is input to the prisms. Strictly speaking, this is the condition that is required if the light valve is mirror-like when switched dark. In general, the sum of the phase shift of the optics depolarization plus any phase shift introduced by the dark-state light valve should be set to 0° or 180°.

In accordance with the present invention, the remaining portion, i.e. imaginary part, can be eliminated by sending the light beam back through the coatings in the exact reverse sequence in which they were traversed.

Figures 4A, 4B, 4C:
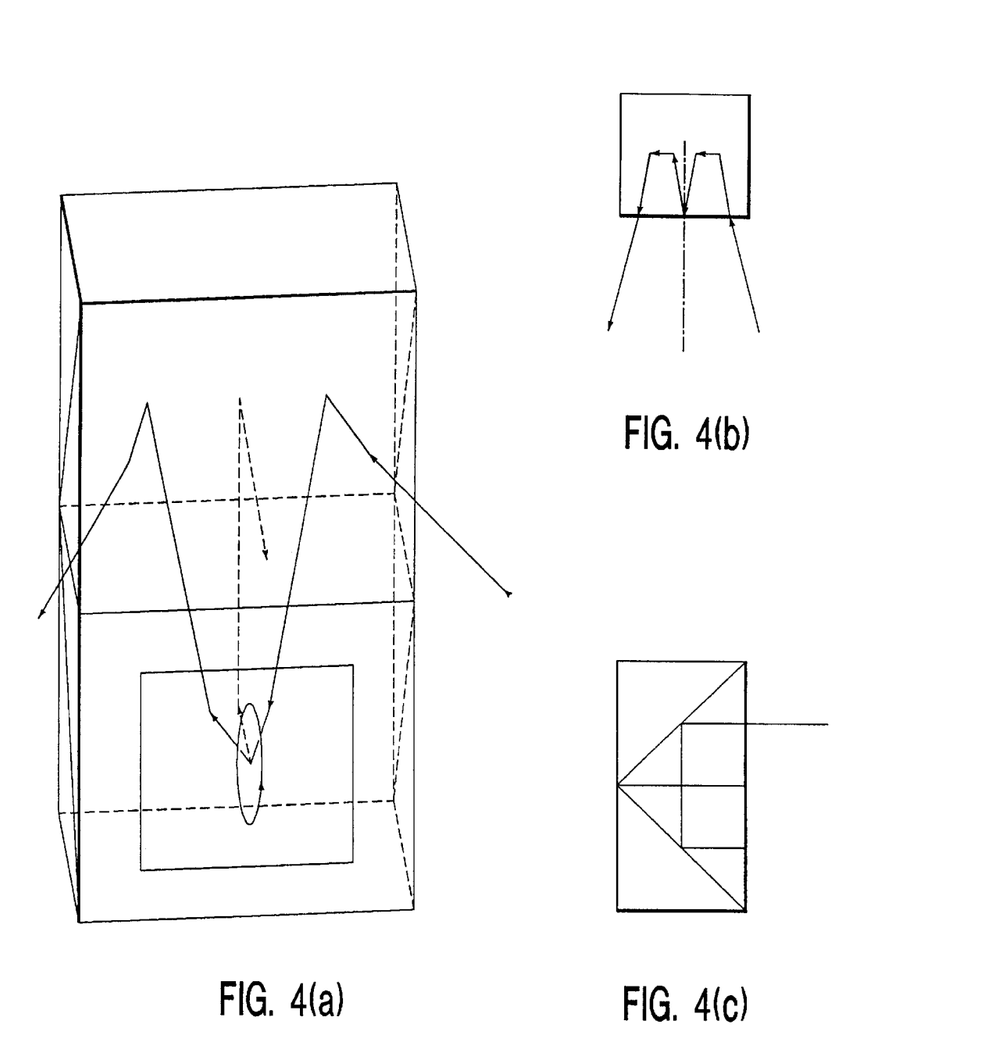
FIGS. 4(a)–(c) are illustrations of the symmetry conditions for a mirror-like light valve: (a) is a prospective view, (b) is a top view, and (c) is a side view.

FIGS. 4(a)–(c) is a simple illustration showing how the symmetry leaves no possibility of a preferred direction in which the double-pass polarization could be rotated; by symmetry the output polarization is substantially parallel to the input. Only when the coatings shows significant inefficiency (due to large differential losses between the two polarizations) does the assumption of double-pass symmetry become inaccurate.

Moreover, FIGS. 4(a)–(c) show schematically the polarization ellipse of a skew ray illuminating a light valve in an optical system with two tilted coatings. In these figures, the ray reflects from two tilted surfaces which are hypotenuse surfaces in the two cube elements. Once the incident ray reflects from the second hypotenuse coating it travels out of the perspective of the figure towards the viewer; it then illuminates a light valve on the front side of the bottom cube. FIGS. 4(a)–(c) also show the case in which the optical system introduces ellipticity, but not rotation. The major axis of the skew ray's ellipse is then aligned with the plane of the central ray. Because of the alignment, the folded path of the central ray forms a plane of symmetry for the electric field as well as for the rays.

Projectors of the present invention must ensure that the FIG. 4 symmetry is not broken by differences in the coating response between the incident and return passes. The ray drawn with black line segments in FIG. 4 is a pure skew ray, as may be seen by considering its orientation relative to the central plane of incidence, i.e. its orientation relative to the plane formed by the various reflected segments of the central ray (which is shown shaded). At any surface the plane that is formed by the black ray segment and the shaded ray segment is perpendicular to the central incidence plane, hence the black ray is a pure skew ray. As a skew ray, it intercepts each tilted surface at the same angle during the incoming and outgoing passes, hence the coating properties are the same in both passes, and the FIG. 4 symmetry is preserved.

Meridional rays in the beam are tilted in an orthogonal direction to skew rays. In other words, the tilt of a pure meridional ray relative to the central ray lies entirely within the central plane of incidence. Meridional rays see different angles of incidence during the incoming and outgoing passes at each coating, and so may see different coating responses when the NA is large. However, the tilt of meridional rays is in a direction that does not mix the polarizations, so no loss in contrast ensues.

Figure 5:
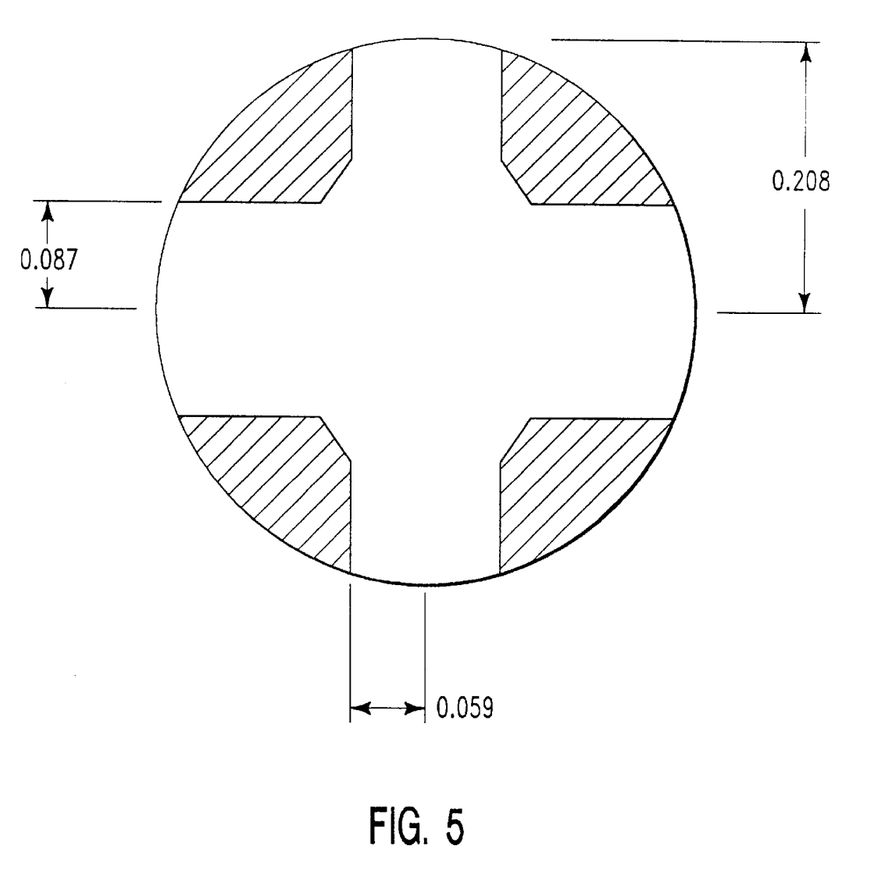
FIG. 5 is a diagram showing a pupil having stops (hatched areas) along the diagonals.

However, as NA increases, angle dependence in the coating properties do pose a risk of disrupting the FIG. 4 symmetric condition for rays that have both skew and meridional components. This high order effect is a concern along the diagonals of the pupil. The effect may be corrected in two ways:

First, as shown in FIG. 5, stops may be placed in the pupil along the diagonals. In this figure, the skew axis is horizontal and the axis for meridional rays is vertical. The hatched regions are opaque. One drawback to the FIG. 5 stops is that the light gathering NA is reduced. In this example, the lens NA is about 0.21 but the effective light gathering NA is reduced to about 0.18.

A preferred approach is to correct the asymmetry in the coatings. This may be done by applying the following equation in 3 different cases, denoted +, 0, and –;

$$I_{(+,0,-)} = \left| \left( \prod_{j=-j}^{j} \xi_j \eta_{j,(+,0,-)} \right) \frac{\kappa_0}{n_{PBS}} + \sum_{j=-j}^{j} \left[ (\eta_{j,(+,0,-)} - 1) \left( \prod_{k=j+1}^{j} \xi_k \eta_{k,(+,0,-)} \right) \frac{\xi_j \kappa_j}{n_j \tan \varphi_{0,j}} \right] \right|^2$$

Here negative counter indices in the summation and the products represent the incoming pass, and positive values the outgoing. $\eta_{j,+}$ represents the coating differential phase shift at the jth surface for a ray that is incident at the initial surface with a skew angle ±NA/2 and meridional angle +f*NA, where f is an adjustable parameter. (More exactly, $\eta$ is the ratio of the P to S amplitude reflectances or transmittances, depending on whether the ray is reflected or transmitted through the surface.) Two useful values for f are ½ and the square-root of ⅙, as discussed further below. Similarly, $\eta_{j,-}$ represents the differential coating response for a ray incident at skew angle ±NA/2 and meridional angle –f*NA, while $\eta_{j,0}$ corresponds to a pure skew ray. The coating-induced asymmetry is reduced to an acceptable level by minimizing the quantity $$\frac{1}{12f^2}[I_+ + I_- + 2(6f^2 - 1)I_0]$$

When using a computer program to optimize the coatings, it is desirable to minimize the computation time associated with the above expression. By setting f to the square root of ⅙ (about 0.4) the need to compute $I_0$ is eliminated. Another factor of almost 2 can be saved by recognizing that most of the computation time involved in evaluating the above expressions arises in the calculation of the η factors, and that these factors are to a good approximation the same for $I_+$ and $I_-$, except that they appear in reverse order. Thus, the above expresions can be evaluated with about the same computation as is involved in tracing one ray through the system.

As a rough rule of thumb, for NA's below about 0.14, or when contrast requirements are not stringent, the coating angle dependence can be neglected. For NA's between about 0.14 and about 0.167 (f/3) one can use f=1/sqrt (6). For NA's between about 0.167 and 0.2 one should use a larger value of f, such as f=0.5 or 0.6. At higher NA's more rays should be used.

While the present invention has been particularly shown and described with respect to preferred embodiments thereof, it will be understood by those skilled in the art that the foregoing and other changes in form and detail may be made without departing from the scope and spirit of the present invention. It is therefore intended that the present invention not be limited to the exact forms described and illustrated, but fall within the scope of the appended claims.

Having thus described my invention, what I claim as new and desire to secure by the Letters Patent is:

1. An optical element useful in optical display devices, said optical element comprising a set of prisms having at least one surface adapted for receiving an incident beam which is coated with at least one dichroic coating, wherein the set of prisms are designed such that one component of depolarization is eliminated by returning reflected light through said coatings of said prisms in the same sequence as the incident beam enters, but in reverse order, and wherein another component of depolarization is eliminated by designing the prisms such that $\psi_{optics}=-\psi_{LV}$ wherein $\psi_{optics}$ is the phase of depolarization caused by the prisms and $\psi_{LV}$ is the phase of depolarization caused by an adjacent light valve.

2. The optical element of claim 1 wherein said adjacent light valve is a liquid crystal light valve.

3. An optical element useful in optical display devices, said optical element having at least one surface adapted for receiving an incident beam having a linear polarization, said at least one surface has at least one dichroic coating thereon which has the property of being able to transform an input linear polarized beam passing therethrough into an elliptically polarized beam having a principal axis at a first predetermined orientation with respect to the direction of the polarization of the linear polarized beam, said surface is adapted to receive a return elliptically polarized beam, said at least one coating has the property of transforming at least 99% of said return elliptically polarized beam into a linear polarized beam coincident with said input linear polarized beam and having the same direction of polarization as said input linear polarized beam when said elliptically polarized beam and said return elliptically polarized beam have opposite directions of rotation when viewed from the direction of propagation and when said return elliptically polarized beam has a second predetermined orientation of its principal axis with respect to the direction of the polarization of the linear polarized beam, said at least one coating further having the property of reflecting at least 99% of said return polarized beam into a linear polarized beam having a linear polarization substantially perpendicular to the linear polarization of the incident polarized beam when said return elliptically polarized beam has a principal axis having a third predetermined orientation with respect to the direction of the polarization of the incident beam which is substantially perpendicular to the second predetermined orientation and has the same direction of rotation as the elliptically polarized beam when viewed from the direction of propagation.

4. The optical element of claim 3 wherein said return elliptically polarized beam transmits said at least one coating in reverse order to said incident linear polarized beam.

5. The optical element of claim 4 further comprising a plurality of surfaces each adapted to transmit and reflect a different wavelength of light and adapted to separate an incident beam having a plurality of wavelengths into a plurality of beams of said separate wavelengths and further adapted for recombining a plurality of beams returned to said plurality of surfaces.

6. The optical element of claim 5 wherein said plurality of beams are reflected by a plurality of light valves.

7. The optical element of claim 6 wherein said plurality of light valves are light crystal light valves.

8. The optical element of claim 1 wherein said prisms further comprise additional dummy plates or auxiliary coatings.

9. An optical projection system comprising at least said optical element according to claim 1.

10. The optical projection system of claim 9 wherein said incident beam is transmitted from a lamp source and illumination optics prior to reaching said optical element.

11. The optical projection system of claim 9 further comprising a projection lens and a projection screen which are positioned after said optical element.

12. A optical projection system comprising at least said optical element of claim 3.

13. The optical projection system of claim 12 wherein said incident beam is transmitted from a lamp source and illumination optics prior to reaching said optical element.

14. The optical projection system of claim 12 further comprising a projection lens and a projection screen which are positioned after said optical element.

* * * * *

UNITED STATES PATENT AND TRADEMARK OFFICE
CERTIFICATE OF CORRECTION

PATENT NO. : 6,052,231
DATED : April 18, 2000
INVENTOR(S) : Alan Edward Rosenbluth It is certified that error appears in the above-identified patent and that said Letters Patent are hereby corrected as shown below:

Column 4, Line 3: "In view" should begin new paragraph.

Column 5, Line 58: "$\Re$" should read --$\Re=0$--

Column 6, Line 50: "$\Re=1$" should read --$\Re=0$--

Signed and Sealed this

Third Day of April, 2001

*Attest:*

NICHOLAS P. GODICI

*Attesting Officer*     *Acting Director of the United States Patent and Trademark Office*